US00RE36017E

United States Patent [19]

Uddenfeldt et al.

[11] E Patent Number: Re. 36,017

[45] Reissued Date of Patent: Dec. 29, 1998

[54] CELLULAR DIGITAL MOBILE RADIO SYSTEM AND METHOD OF TRANSMITTING INFORMATION IN A DIGITAL CELLULAR MOBILE RADIO SYSTEM

[75] Inventors: Jan E. Uddenfeldt, Vällingby; Alex K. Raith, Kista, both of Sweden

[73] Assignee: Telefonaktiebolaget LM Ericsson, Stockholm, Sweden

[21] Appl. No.: 136,760

[22] Filed: Oct. 15, 1993

Related U.S. Patent Documents

Reissue of:

[64] Patent No.: 5,088,108
Issued: Feb. 11, 1992
Appl. No.: 579,283
Filed: Sep. 6, 1990

U.S. Applications:

[63] Continuation of Ser. No. 315,561, Feb. 27, 1989, abandoned.

[30] Foreign Application Priority Data

Feb. 29, 1988 [SE] Sweden ..... 8800698

[51] Int. Cl.[6] ..... H04B 7/04; H04B 7/26

[52] U.S. Cl. ..... 375/230; 375/267; 455/442

[58] Field of Search ..... 455/33.1, 33.3, 455/33.4, 51.1, 51.2, 52.3, 54.1, 56.1, 63, 65, 436, 437, 442, 443, 444, 525; 379/59, 60, 63; 342/350, 367, 368, 463, 464; 375/229, 230, 232, 260, 267, 299, 348

[56] References Cited

U.S. PATENT DOCUMENTS

| | | | |
|---|---|---|---|
| 2,745,953 | 5/1956 | Young, Jr. | 455/33.4 |
| 3,819,872 | 6/1974 | Hamrick | 455/438 |
| 4,057,758 | 11/1977 | Hattori et al. | 375/267 |
| 4,097,804 | 6/1978 | Yamaguchi et al. | 455/101 |
| 4,112,257 | 9/1978 | Frost | 455/437 |
| 4,152,647 | 5/1979 | Gladden et al. | 375/211 |

(List continued on next page.)

FOREIGN PATENT DOCUMENTS

| | | |
|---|---|---|
| 40731 | 12/1981 | European Pat. Off. . |
| 72479 | 2/1983 | European Pat. Off. . |

(List continued on next page.)

OTHER PUBLICATIONS

"Multi-Path Equilization for Digital Cellular Radio Operating at 300 KBIT/S"; K Raith, J-E Stjernvall, J. Uddenfeldt; 36th IEEE Vehicular Technology Conference, pp. 268–272; Dallas, Tex., U.S.A., May 1986.

(List continued on next page.)

*Primary Examiner*—Hassan Kizou
*Attorney, Agent, or Firm*—Burns, Doane, Swecker & Mathis, L.L.P.

[57] ABSTRACT

The invention relates to a cellular digital mobile radio system including base stations ($B_m$, $B_n$) and mobile stations ($MS_1$, $MS_2$) with transmitters and receivers. The invention also relates to a method of transmitting message information digitally between mobile and base stations in such a system. In accordance with the invention, at least two base station transmitters ($B_{ma}$, $B_{mb}$, $B_{na}$, $B_{nb}$) at a given transmitting distance from each other are assigned to each of certain cells ($C_m$, $C_n$) within a restricted geographical area. The base station transmitters which are assigned to the same cell transmit digitally modulated radio signals within the same frequency range at least partially simultaneously to the mobile stations of the cell. The radio signals from different base station transmitters associated with the same cell are digitally modulated with the same message information to the mobile stations in the cell. Different base station transmitters (9A, 9B) preferably transmit the digitally modulated radio signals with the same message information to a given mobile station with a given mutual transmission time shift. Here, the transmission time shift is selected individually for each mobile station, such that corresponding digitally modulated radio signals with the same message information to a given mobile station from different base station transmitters arrive practically simultaneously at the mobile station.

39 Claims, 2 Drawing Sheets

U.S. PATENT DOCUMENTS

| | | | |
|---|---|---|---|
| 4,211,894 | 7/1980 | Watanabe et al. | 370/57 |
| 4,222,115 | 9/1980 | Cooper et al. | 375/200 |
| 4,255,814 | 3/1981 | Osborn | 455/51.2 |
| 4,308,429 | 12/1981 | Kai et al. | 455/439 |
| 4,383,332 | 5/1983 | Glance et al. | 455/33.3 |
| 4,398,063 | 8/1983 | Hass et al. | 455/436 |
| 4,475,246 | 10/1984 | Batlivala et al. | 455/18 |
| 4,490,830 | 12/1984 | Kai et al. | 455/33.4 |
| 4,516,267 | 5/1985 | Krinock | 455/51.2 |
| 4,516,269 | 5/1985 | Krinock | 455/51 |
| 4,596,042 | 6/1986 | Stangl | 455/56.1 |
| 4,633,519 | 12/1986 | Gotoh et al. | 455/277.2 |
| 4,642,633 | 2/1987 | Dunkerton et al. | 340/825.76 |
| 4,644,560 | 2/1987 | Torre et al. | 375/205 |
| 4,667,202 | 5/1987 | Kammerlander et al. | 342/457 |
| 4,675,863 | 6/1987 | Paneth et al. | 455/33.3 |
| 4,696,051 | 9/1987 | Breeden | 455/33.1 |
| 4,696,052 | 9/1987 | Breeden | 455/51.2 |
| 4,697,260 | 9/1987 | Grauel et al. | 370/335 |
| 4,698,839 | 10/1987 | DeVaney et al. | 455/560 |
| 4,715,048 | 12/1987 | Masamura | 375/347 |
| 4,718,081 | 1/1988 | Brenig | 379/60 |
| 4,718,109 | 1/1988 | Breeden | 455/51.2 |
| 4,723,266 | 2/1988 | Perry | 379/60 |
| 4,737,978 | 4/1988 | Burke et al. | 379/60 |
| 4,759,051 | 7/1988 | Han | 379/59 |
| 4,765,753 | 8/1988 | Schmidt | 379/60 |
| 4,771,488 | 9/1988 | Koohgoli et al. | 455/33.4 |
| 4,811,380 | 3/1989 | Spear | 379/60 |
| 4,850,032 | 7/1989 | Freeburg | 455/51 |
| 4,852,090 | 7/1989 | Borth | 455/65 |
| 4,856,048 | 8/1989 | Yamamoto et al. | 455/439 |
| 4,901,307 | 2/1990 | Gilhousen et al. | 370/18 |
| 4,930,140 | 5/1990 | Cripps et al. | 375/205 |
| 4,955,082 | 9/1990 | Hattori et al. | 455/33.1 |
| 4,984,247 | 1/1991 | Kaufmann et al. | 375/208 |
| 5,022,049 | 6/1991 | Abrahamson et al. | 375/205 |
| 5,048,059 | 9/1991 | Dent | 375/340 |
| 5,056,109 | 10/1991 | Gilhousen et al. | 375/205 |
| 5,091,942 | 2/1992 | Dent | 380/46 |
| 5,095,531 | 3/1992 | Ito | 455/435 |
| 5,101,501 | 3/1992 | Gilhousen et al. | 455/33.2 |
| 5,103,459 | 4/1992 | Gilhousen et al. | 375/206 |
| 5,109,390 | 4/1992 | Gilhousen et al. | 375/205 |
| 5,124,698 | 6/1992 | Mustonen | 340/825.44 |
| 5,126,748 | 6/1992 | Ames et al. | 342/353 |
| 5,128,959 | 7/1992 | Bruckert | 375/205 |
| 5,179,571 | 1/1993 | Schilling | 375/205 |
| 5,257,283 | 10/1993 | Gilhousen et al. | 375/1 |
| 5,265,119 | 11/1993 | Gilhousen et al. | 375/1 |
| 5,267,261 | 11/1993 | Blakeney, II et al. | 375/1 |
| 5,267,262 | 11/1993 | Wheatley, III | 375/1 |
| 5,280,472 | 1/1994 | Gilhousen et al. | 370/18 |
| 5,383,219 | 1/1995 | Wheatley, III et al. | 375/1 |
| 5,437,055 | 7/1995 | Wheatley, III | 455/33.3 |
| 5,452,473 | 9/1995 | Weiland et al. | 455/88 |
| 5,461,639 | 10/1995 | Wheatley, III et al. | 375/205 |
| 5,475,870 | 12/1995 | Weaver, Jr. et al. | 455/67.1 |
| 5,485,486 | 1/1996 | Gilhousen et al. | 375/205 |
| 5,490,165 | 2/1996 | Blakeney, II et al. | 375/205 |
| 5,509,035 | 4/1996 | Teidemann, Jr. et al. | 375/356 |
| 5,513,176 | 4/1996 | Dean et al. | 370/18 |
| 5,519,761 | 5/1996 | Gilhousen | 370/59 |
| 5,528,593 | 6/1996 | English et al. | 370/84 |

FOREIGN PATENT DOCUMENTS

| | | |
|---|---|---|
| 72984 | 3/1983 | European Pat. Off. . |
| 0274857A1 | 7/1988 | European Pat. Off. . |
| 274857 | 7/1988 | European Pat. Off. . |
| 3012141 | 10/1981 | Germany . |
| 3022425 | 12/1981 | Germany . |
| 0045882 | 1/1970 | Japan . |
| 57-73539 | 5/1982 | Japan . |
| 58-111443 | 7/1983 | Japan . |
| 58-159083 | 9/1983 | Japan . |
| 59-176935 | 10/1984 | Japan . |
| 59-212041 | 11/1984 | Japan . |
| 60-52131 | 3/1985 | Japan . |
| 60-42950 | 7/1985 | Japan . |
| 61-171269 | 8/1986 | Japan . |
| 62-132444 | 6/1987 | Japan . |
| WO87/01897 | 3/1987 | WIPO . |

OTHER PUBLICATIONS

NTG–Fachberichte, Bewegliche Funkdienste, Vortrage der NTG–Fachtagung vam 25. bis 27 Nov. 1985, in Munich, "Gleichkanalfunksysteme fur die Frequenzokonische Versorgung Grosser Gebiete", Berndt Heynisch, pp. 41–46, VDE–VERLAG GmbH, Berlin.

Radio Test Performance of a Narrowband TDMA System, J–E Stjernall, Bo Hedberg and S. Ekemark, IEEE Vehicular Conference, Tampa, Fla., U.S.A., Jun. 1987.

Elektrizitatswirtschaft, Jg. 80(1981), Heft 6, pp. 187–198, "Quasissynchroner Gleichwellenfunk–ein Gleichkanalfunk–Verfahren zur Erhohung der Erreichbarkeit in Mobilfunknetzen".

Nakajima, A., *Advanced Mobile Communication Network Based on Signaling System No. 7,* International Switching Symposium (1987).

Turin, G., *Introduction to Spread–Spectrum Antimultipath Techniques and Their Application to Urban Digital Radio,* Proceedings of the IEE, vol. 68, No. 3 (1980).

Monsen, P., *Digital Transmission Performance on Fading Dispersive Diversity Channels,* IEEE Transactions on Communications, vol. COM–21, No. 1 (1973).

Bennett, M. et al., *A Hand–Off Algorithm for Cellular Radio Based on Reed–Solomon Coding* Dialog Abstract from IEEE Colloquium on 'Mobile Radio Networks' (1988).

Wolf Herold, "Changing Radio Zones of Fixed Stations by Mobile Subscribers", Communication form AEG–Telefunken Wireless Communications Research Institute, Ulm (Germany), pp. 173–179. [English language translation enclosed.].

Richard H. Frenkiel, "A High–Capacity Mobile Radiotelephone System Model Using a Coordinated Small–Zone Approach", IEEE Transaction on Vehicular Technology, vol. VT–19, No. 2, pp. 173–177 (1970).

J. und Kaplan, G. S. Shefer, "An X–Band Vehicle–Location System", IEEE Transaction on Vehiclular Technology, vol. VT–21, No. 4, pp. 117–120 (Nov., 1972).

Takahiro Morinaga et al., "Automatic Selection of Fixed Receiving Stations in Mobile Radio Systems", Review of the Electrical Communication Laboratory, vol. 16, Nos. 5–6, pp. 374–384 (May–Jun. 1968).

W. Herold, "A Small–Zone Radio Telephone System with Code Division Multiple Access", Proc. Internat. Zurich Seminar, F6 1–4 (1974).

K. D. Schenkel, "Entwurf Eines Integrierten Digitalen Nachrichtensystems mit Veilfachzugriff fur ein Beliebig Verzeigtes Breitbandnetz", AEU 27, pp. 168–176 (1973).

J. J. Spilker, Jr., et al., "The Delay–Lock Discriminator–An Optimum Tracking Device", Proc. Inst. Radio Engrs. 43, pp. 1403–1416 (1961).

J. R. Sergo et al., "Analysis and Simulation of a PN Synchronization System", Transact. Inst. Electr. Electron. Engrs. Com–18, pp. 676–679 (1970).

W. Herold, "Fangverhalten einer Phasenregelschleife mit Sägezahn–Komparator", AEU 25, pp. 226–230 (1971).
Y. Okumura et al., "Field Strength and its Variability in VHF in UHF Land–Mobile Radio Service", Ref. Electr. Commun. Lab. (Japan) 15, pp. 825–873 (1968).
William G. Figel et al., "Vehicle Location by a Signal Attenuation Method", Transact. Inst. Elect. Electron. Engrs. VT–18, pp. 105–109 (1969).
W. Herold et al., "Aufbau und Eigenschaften von Quasiorthogonalen Codekollektiven", AEU 27, pp. 463–470 (1973).
W. Herold, "Nachrichtentechnische Zeitschrift", NTZ, 27, pp. 253–259 (1974).
Richard C. Bernhardt, "User Access in Portable Radio Systems in the Noise Limited Environment", pp. 1–8, Bell Communications Research Inc., Jun. 1987.
Richard C. Bernhardt, "RF Performance of Macroscopic Diversity in Universal Digital Portable Radio Communications: Frequency Reuse Considerations", pp. 65–71, IEEE Conference, Jun. 1986.
International Application No. PCT/SE90/00199, international publication date: Nov. 1, 1990.
International Application No. PCT/US90/06416, international publication date: May 16, 1991.
Abstract for JP 60–42950(A), "Dynamic Zone Designation Type Mobile Communication System".
Richard C. Bernhardt, "User Access in Portable Radio Systems in the Noise Limited Environment", *IEEE International Conference on Communications '87*, pp. 1–8 (1987).
Richard C. Bernhardt, "RF Performance of Macroscopic Diversity in Universal Digital Portable Radio Communications: Frequency Reuse Considerations", *IEEE International Conference on Communications*, pp. 65–71 (1986).
Andrew J. Viterbi, "Very Low Rate Convolutional Codes for Maximum Theoretical Performance of Spread–Spectrum Multiple–Access Channels", *IEEE Journal on Selected Areas in Communications*, vol. 8, No. 4, pp. 641–649 (1990).
A.M. Kerdock, "A Class of Low–Rate Nonlinear Binary Codes", *Information and Control*, vol. 20, pp. 182–187 (1972).
F.J. MacWilliams and N.J.A. Sloane, *The Theory of Error–Correcting Codes, Part I*, pp. 93–124 (1977).
F.J. Macwilliams and F.J.A. Sloane, *The Theory of Error–Correcting Codes, Part II*, pp. 451–465 (1977).

CELLULAR DIGITAL MOBILE RADIO SYSTEM AND METHOD OF TRANSMITTING INFORMATION IN A DIGITAL CELLULAR MOBILE RADIO SYSTEM

Matter enclosed in heavy brackets [ ] appears in the original patent but forms no part of this reissue specification; matter printed in italics indicates the additions made by reissue.

This application is a continuation of application Ser. No. 315,561, filed Feb. 27, 1989, now abandoned.

TECHNICAL FIELD

The present invention relates to mobile radio systems. More specifically the invention relates to a digital, cellular, mobile radio system. The invention also relates to a method of transmitting information digitally to and from mobile stations in a cellular mobile radio system.

BACKGROUND ART

The mobile radio systems that were first taken into common use were of analog type, i.e. message information was transmitted in analog form to and from mobile stations by transmitting and receiving analog-modulated radio signals. In such systems it is known to have two or more base station transmitters at a distance from each other simultaneously transmitting radio signals within the same frequency range and modulated with the same message information to the mobile stations. Such mobile radio systems are described in EP 0040731 and EP 0072479, as well as in the two publications: NTG-Fachberichte, Bewegliche Funkdienste, Vorträge der NTG-Fachtagung vom 25. bis Nov. 27, 1985 in Munich, "GLEICHKANALFUNKSYSTEME FüR DIE FREQUENZÖKONISCHE VERSORGUNG GROSSER GEBIETE" Berndt Heynisch pp 41–46, VDE-VERLAG GmbH, Berlin, Elektrizitätswirtschaft, Jg. 80(1981), Heft 6, pp 187–198 "Quasis-synchroner Gleichwelienfunk-ein GleichkanalfunkVer-fahren zur Erhöhung der Erreichbarkeit in Mobilfunknetzen.

In known systems or the kind in question here, it is known to transmit message information from a central station or exchange to the base station transmitters via either cables or radio signals. It is also known to have equalizers in the fixed part of the mobile radio system for equalizing differences in propagation time and attenuation in transmission from the exchange to the base station transmitters. The equalizers can be at the exchange and/or at the base station transmitters. The object of the equalisers is that irrespective of position in relation to the exchange the base station transmitters shall transmit the radio signals simultaneously, and modulated with the same message information.

Digital mobile radio systems in which message information is transmitted digitally to and from mobile stations by transmission and reception of digitally modulated signals have been proposed in U.S. Pat. No. 4,675,863 and "Digital Mobile Telephone System Using TD/FDMA Scheme", Kota Kinoshita, Masaharu Hata and Kenkichi Hirade, IEEE TRANSACTIONS ON VEHICULAR TECHNOLOGY, VOL VT-31, NO.4, NOVEMBER 1982, pp 153–157.

It has been proposed to have adaptive equalizers in mobile radio stations in digital radio systems, whereby multi-path propagation of radio signals can be used to improve signal quality, instead of the multipath propagation acting as noise. Among the publications on adaptive equalizers in digital mobile radio systems can be mentioned: "Multi-path Equalization for Digital Cellular Radio Operation at 300 k. bi/s". K Raith, J-E Sjternvall and J Uddenfeldt, 36th IEEE Vehicular Technology Conference, pp 268–272, Dallas. Tex., U.S.A. May 1986. "Radio Test Performance of a Narrowband TDMA System", J-E Stjernvall, B. Hedberg, and S Ekmark, IEEE Vehicular Conference, Tampa, Fla., U.S.A., June 1987, RADIO TEST PERFORMANCE OF A NARROWBAND TDMA SYSTEM-DMS 90, J-E Stjervall, B. Hedberg, K Raith, T Baickstrbm and R Lofdahl.

SUMMARY OF THE INVENTION

In mobile radio systems there are problems due to reflections and radio shadows from natural obstacles such as rocks and hills, as well as structures such as buildings. These problems are especially troublesome in transmitting information requiring great accessibility/reliability and high transmission speed. In particular the problems may become large in certain urban environments where the propagation conditions for radio signals can vary heavily within a small geographic area, while radio traffic is intensive at the same time. Up to now attempts have been made to solve these problems by having adaptive equalizers in the mobile stations and small cells with specially selected positioning of the base station transmitters. In areas with much traffic it is, however, a desire to be able to select the size of the cells and their positions in the mobile radio system cell plan in an optimum way with respect to the traffic handling capacity of the system. Reducing the cell size and selecting the positions of the small cells to avoid radio shadows thus involves a complication. Another complication resulting from the reduction or cell size to below what is necessary for reasons of capacity is that the number of handovers increases.

The object of the present invention is to solve the above-mentioned problems and complications, and to provide a method and a cellular digital mobile radio system which are also suitable for transmitting information requiring great accessibility/reliability and high transmission speed.

What is distinguishing for a method and a digital cellular mobile radio system in accordance with the present invention, and particularly preferred embodiments thereof is disclosed in the independent and dependent claims. Somewhat simplified, it may be said that according to the present invention at least two base station transmitters are utilized for each of a plurality of cells, these transmitters being at a distance from each other and at least partially simultaneously transmitting radio signals within the same frequency range digitally modulated with the same message information to the mobile stations in the cell. The digital modulation is changed with a modulation time interval which is adapted to the greatest transmitting distance between two base station transmitters serving the same cell in an area. The mobile stations have adaptive equalizers for reconstructing the digital modulation in the transmitted signals from the signals received during a reception time interval, which is also adapted to the greatest transmitting distance between two base station transmitters serving the same cell in an area.

In a preferred embodiment of a method in accordance with the present invention, the digitally modulated signals are transmitted with the same message information to a given mobile station with a given, mutual transmission time shift from the different base stations. The transmission shift is then selected such that it counteracts the difference in arrival time for the signals from the different base station transmitters to this mobile station.

In each mobile station, there is preferably estimated the arrival time shift between the digitally modulated radio signals with the same message information from the different base station transmitters. Information about the estimated arrival time shift at the respective mobile station is transmitted from there to at least one base station transmitter. This estimated arrival time shift is utilized at the base station for selecting the transmission time shift for at least one base station transmitter. A transmission time shift is thus obtained individually for each affected mobile station, and which is adjusted for this particular mobile stations's position in relation to the base station transmitters. The amount or transmissions time shift can thus vary from mobile station to mobile station.

According to a somewhat different, preferred embodiment, there is estimated in different base station receivers the reception time shift between corresponding radio signals with the same message information from the mobile station. This estimated reception time shift is utilized for selecting the transmission time shift between corresponding base station transmitters. A transmission time shift can thus be individually obtained for each affected mobile station such that it is adjusted to the position of this particular mobile station in relation to the base station transmitters. The amount of transmission time shift can thus vary from mobile station to mobile station.

A preferred embodiment of a mobile, radio system in accordance with the present invention has a time measurement unit for estimating the mutual reception time shift in a mobile station between, on one hand, digitally modulated radio signals transmitted to the mobile station via a base station transmitter for the cell where this mobile station is, and, on the other hand, corresponding digitally modulated signals transmitted to this station via another base station transmitter for the cell. In this embodiment the mobile radio system has a transmission time shifting unit for mutually time shifting the transmission times for base station transmitters of the same cell so that they transmit corresponding digitally modulated signals to the mobile station with greater or less mutual transmission time shifting in response to estimated reception time shift.

The time measurement unit preferably includes an arrival time comparison unit in at least certain mobile stations, for comparing the arrival times for corresponding digitally modulated signals transmitted from different base station transmitters for the same cell.

According to a somewhat different, preferred embodiment, the time measurement unit includes an arrival time comparison unit in the stationary part of the mobile radio system, for comparing the arrival times of digitally modulated signals transmitted from a mobile station in a cell and received at different base station transceivers of the cell.

A method and a cellular digital mobile radio system in accordance with the invention provide substantial advantages. The coverage degree can be made greater, signifying better opportunities for establishing new connections and maintaining those already established. The coverage degree can be made greater without the cell size needing to be reduced, which give greater freedom in the selection of cell plan and a lesser number of handovers. In preferred embodiments, the transmission time shift, which is individually selectable for each mobile station, reduces the risk of noise and interruption of calls in progress, when a mobile station goes from receiving signals chiefly from one base station transmitter to receiving signals chiefly from another base station transmitter. When a mobile station simultaneously receives signals from at least two base station transmitters of the same cell, the variable transmission time shift enables the received signals together to be more like the signals obtained from a single base station transmitter in conjunction with reflections.

DETAILED DESCRIPTION OF THE PREFERRED EMBODIMENTS

A cellular mobile radio system in accordance with the present invention has mobile stations and base stations with transmitters and receivers for radio signals. Message information is transmitted digitally to and from the mobile stations by transmission and reception of signals digitally modulated in correspondance with the message information. The radio signals are transmitted on one of a plurality of radio channels. Signals can be transmitted in time multiple to and from several mobile stations on the same radio channel.

The mobile stations move within and between the cells of the system. The base station transmitters are assigned to the cells so that there is at least one base station transmitter for each cell, for transmitting signals to the cell's mobile stations.

Figure 1:
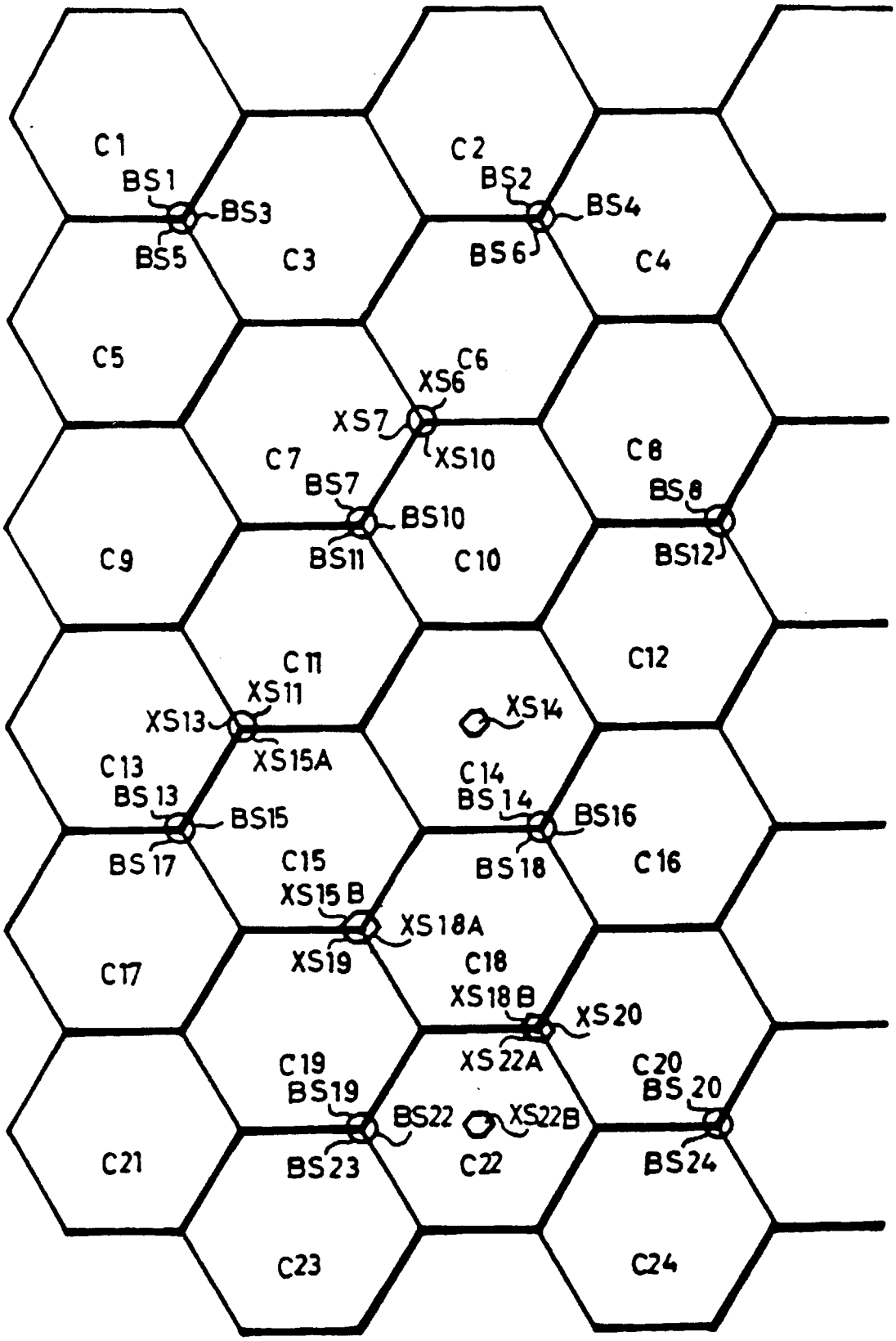
FIG. 1 illustrates cells and positioning of transmitters in base stations in one embodiment of a mobile radio system in accordance with the invention.

Somewhat simplified, there is illustrated in FIG. 1 the division of an area into cells and the assignation of base station transmitters to the cells in a mobile telephone system in accordance with the present invention. For the sake of simplicity in FIG. 1, all cells C1 to C24 are illustrated as regular hexagons with sides L. In practice, the cells will probably have different sizes and shapes. In addition, depending on service conditions, it will often be suitable with overlapping in the boundary areas between the cells. To a certain extent, the base station transmitter can then off-load each other by handling transmissions to mobile stations where such transmissions should, from a purely geographic point of view, be performed by the base stations of a contiguous cell.

For each cell C1–C24 there is an ordinary base station transmitter BS1–BS24. For contiguous cells these transmitters are conventionally co-located in groups of three. For example, the base station transmitter BS1 for the cell C1 is co-located with the base station transmitter BS3 for the cell C3 and the base station transmitter BS5 for the cell C5. Correspondingly, the base station transmitter BS14 for the cell C14 is co-located with the base station transmitter BS16 for the cell C16 and with the base station transmitter BS18 for the cell C18. These co-positioned ordinary base station transmitters are situated in the boundary areas between the cells to which they are assigned. For example, the ordinary base station transmitters BS2, BS4 and BS6 are co-located in the boundary areas between the cells C2, C4 and C6.

Further to the ordinary base station transmitters BS1–BS24, the system includes a number of extra base station transmitters for certain of the cells. Cells C6, C7, C10, C11, C13, C14, C19 and C20 each has one extra base station transmitter. For each of the cells C15, C18 and C22 there are two extra base station transmitters. The extra base station transmitters XS6, XS7, XS10, XS11, XS13, XS15A, XS15B, XS18A, XS18B, XS19, XS20 and XS22A are co-located in groups with three extra base station transmitters in each group in a similar manner as the ordinary base station transmitters. Accordingly, for example, the extra base station transmitter XS15B for the cell C15 is co-located with the extra base station transmitter XS19 for the cell C19 and the extra base station transmitter XS18A for the cell C18. On the other hand, neither the extra base station transmitter XS14 for the cell C14 nor the extra base station transmitter XS22B for the cell C22 are co-located with any other base station transmitter, but are situated approximately at the center of the cell with which they are associated.

An extra base station transmitter does not need to differ technically from an ordinary base station transmitter. For a given cell or extra base station transmitter can thus have technical equipment of the same type as an ordinary base station transmitter for the same cell. In principle it can also function in the same way as the ordinary one. If there are two identical base station transmitters for a given cell, in certain cases either of them may be respectively regarded as ordinary or extra.

The extra base station transmitter or transmitters for a given cell transmit radio signals which are substantially the same as those sent by the ordinary base station transmitter of the cell. The radio signals are digitally modulated with digital message information to the mobile stations in the cell. A mobile station in a cell for which there is one or more extra base station transmitters can therefore receive, at least in certain cases, corresponding radio signals from more than one base station transmitter approximately simultaneously within the same frequency range (radio channel). Depending on the mutual, relative positions in the cell of the mobile and base stations as well as the transmission times and propagation paths of the radio signals from the base station transmitters to the mobile stations, corresponding radio signals from different base station transmitters can be received without, or with a given time shift at the mobile station. The greater the distance between the base station transmitters associated with the cell, the greater, in general can be the time shift. When the ordinary base station transmitters and the extra base station transmitters are situated according to FIG. 1, the distance between two base station transmitters for the same cell varies between L and 2L, i.e. between the side and diameter of the regular hexagons. If, for the sake of simplicity, reflections are ignored and the assumption made that the transmitters transmit without mutual time shifting, the time reception shift at the mobile station could then attain a maximum of 2L/c, where c is the propagation speed or the radio signals. C is approximately 300000 km/s.

Figure 2:
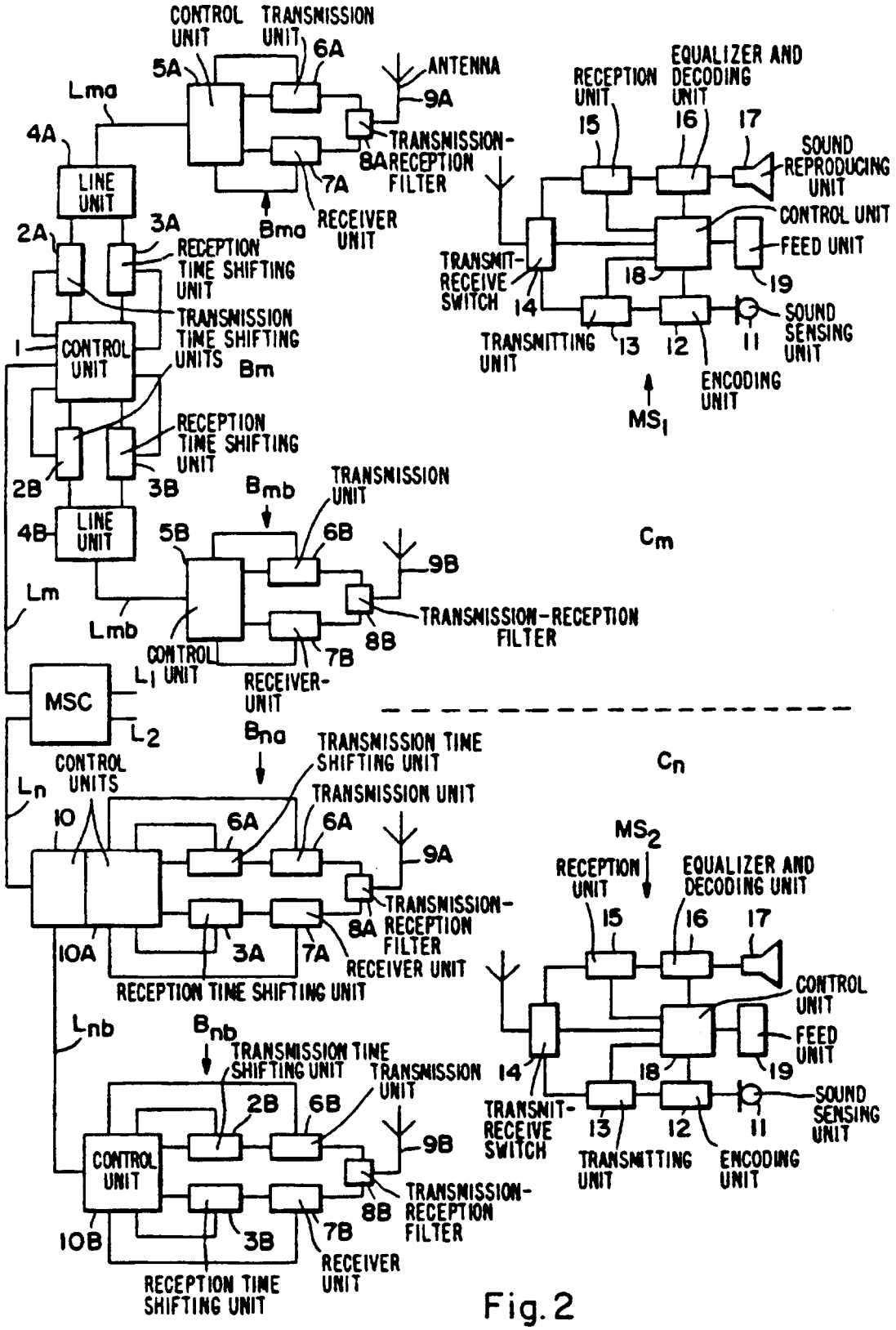
FIG. 2 illustrates parts or a mobile radio system in accordance with the invention.

In FIG. 2 there are illustrated parts of a mobile radio system in accordance present invention. A mobile radio exchange MSC is connected via cables $L_1, L_2, \ldots L_m, L_n$ to a plurality of base stations, of which two, $B_m$ and $B_n$ are illustrated in FIG. 2.

The base station $B_m$ has a central unit connected via cables $L_{ma}$ and $L_{mb}$ to two transceiver units $B_{ma}$ and $B_{mb}$ situated at a distance from the central unit. The central unit of the base station $B_m$ includes a central line and control unit 1, transmission time shifting (Tts) units 2A and 2B, one for each of the transceivers, reception time shifting (Rts) units 3A and 3B, one for each of the transceivers and line units 4A and 4B, one for each of the transceivers.

Both transceivers in the base station $B_m$ are alike. Each such transceiver contains a line and control unit (CU) 5A or 5B, transmitter (T) units 6A or 6B, receiver (R) units 7A or 7B, a transmission-reception filter (tRF) 8A or 8B and an antenna 9A or 9B.

The base station $B_n$ differs partly from station $B_m$, primarily due to its central line and control unit (CU) 10 being situated in connection with one of its transceivers $B_{na}$. Accordingly, no cable with associated line units corresponding to $L_m$, $L_{mb}$, 4A–5B is needed for the transceiver $B_{na}$, but only to the other transceiver $B_{nb}$. In addition, no transmission or reception time shifting units are included in any central unit in $B_n$, but the corresponding units 2A, 2B, 3A and 3B are respectively included in transceivers $B_{na}$ and $B_{nb}$.

The mobile stations $MS_1$ and $MS_2$ are mutually alike. Each mobile station includes sound sensing (SS) unit 11, encoding (EN) unit 12, transmitting M unit 13, transmit-receive switch (TRS) 14, reception (A) unit 15, equalizer and decoding (ED) unit 16, sound reproducing (SR) unit 17, control unit (CU) 18 and a unit (ED) 19 for feeding in our out or presentation of digital information.

Apart from the base stations having two transceiver units at a distance from each other, and having controllable transmission and reception time shifting units, the mobile radio system in FIG. 2 functions in most respects in a way well-known in cellular mobile radio systems. No complete description of how the system functions in different respects should therefore be necessary for one skilled in the art, and it should only be necessary to describe what is unique or unusual in the cellular mobile radio system according to FIG. 2. One not skilled in the art of cellular mobile radio systems is referred to the technical literature and to the publications mentioned under the section "Background of the Invention".

Message information that the mobile radio exchange forwards to a mobile station in the cell $C_m$, e.g. the station $MS_1$, is transmitted from the mobile radio exchange via the cable $L_m$ to the line and control unit 1. From the line and control unit 1 the information is transferred via the transmission time shifting unit 2A, line unit 4A, cable $L_{ma}$ and line and control unit 5A to the transmitting unit 6A. The transmitting unit transmits via the transmission reception filter 8A and antenna 9A radio signals with digital modulation in correspondance with the message information from the mobile radio exchange.

The message information from the mobile radio exchange is also transferred from the line and control unit 1 via the transmission time shifting unit 2B, line unit 4B, cable $L_{mb}$ and line and control unit 5B to the transmission unit 6B in the transceiver $B_{mb}$. The transmission unit 6B transmits via the transmission reception filter 8B and antenna 9B radio signals with digital modulation in correspondance with the information from the mobile radio exchange.

Depending on the delay in transferring the message information to the transmission unit 6A and the corresponding delay in transferring to the transmission unit 6B the radio signals can be transmitted from the antenna 9A of the transceiver unit $B_{ma}$ substantially without time shifting, or time shifted in relation to the transmission of corresponding radio signals from the antenna 9B of the other transceiver $B_{mb}$.

The signals from the antenna 9A in $B_{ma}$ arrive at a given mobile station in the cell $C_m$, e.g. the mobile station $MS_1$, with or without time shift in relation to corresponding radio signals from the antenna 9B in $B_{mb}$. The possible time shift on arrival at the mobile station depends partly on possible time shifting at transmission from the antennas and partly on possible difference in propagation time for the radio waves from the antennas. The transmission time shifting units 2A and 2B have a variable delay and can be controlled by the line and control unit 1, such that the radio signals are transmitted from the antenna 9A in $B_{ma}$ time-shifted more or less before or after corresponding radio signals from the antenna 9B in $B_{mb}$. In the preferred embodiment according to FIG. 2, the line and control unit 1 controls the variable delays in the transmission time shifting units 2A and 2B so that the differences in delay in the cables $L_{ma}$ and $L_{mb}$ as well as the differences in the radio signal propagation times are counteracted. This may also be expressed by saying that the line and control unit controls the variables delays in the transmission time shifting units 2A and 2B, such that the time shift of the radio waves on arrival at the mobile station is decreased compared if the units 2A and 2B had the same fixed delay. It could be thought that the ideal case were that the line and control unit controlled the delays in the time shifting means 2A and 2B so that the digitally modulated radio signals transmitted from the antenna in $B_{ma}$ arrived at the antenna in $MS_1$, exactly simultaneously and in phase with corresponding radio signals transmitted from the antenna in $B_{mb}$. In practice, this is neither desired for nor achieved. Reflections occur in the propagation of the radio signals between the antennas, and the mobile station has an adaptive equalizer. It is therefore not necessary for the signals from the different transceiver units to arrive exactly simultaneously to the mobile station. On the contrary, there is preferably sought a small time shift to achieve diversity against Rayleigh fading. One not skilled in this art and who is desirous of obtaining further information can find it in the publications mentioned in the section "Background Art", e.g. "Radio Test Performance of a Narrow-band TDMA System-DMS 90".

In principle, there are at least two conceivable methods of determining how the line and control unit 1 may control the delay in the transmission time shifting units 2A and 2B. One method is to estimate in the fixed part of the mobile radio system the time shift between the mobile station radio signals at one of the transceivers $B_{ma}$ and the corresponding radio signals at the other transceiver $B_{mb}$. There is thus obtained an estimation of the differences in propagation time to the mobile station. In these differences depending on the position of the mobile station. Remaining differences in delay are related to the fixed part of the mobile radio system, e.g. differences in length of the cables $L_{ma}$ and $L_{mb}$ and are not dependent on the position of the mobile station. In the embodiment according to FIG. 2, this method can be applied in practice such that the delays in the reception time shifting units 3A and 3B are adjusted so that information received from the mobile station $MS_1$ at $B_{ma}$ arrives at the line and control unit 1 simultaneously as corresponding information received at $B_{mb}$ from the mobile station $MS_1$ arrives at the line and control unit 1. The delays in the transmission time shifting units 2A and 2B are subsequently adjusted in correspondence with the optimum delays in the reception time shifting units 3A and 3B.

The other method is to estimate in the mobile station the difference in arrival time or time shift between the digitally modulated radio signals from one transceiver $B_{ma}$ and the corresponding digitally mobile radio signals from the other transceiver $B_{mb}$. Some kind of encoding of the radio signals is required for this, which indicates from which transceiver they are transmitted. In TDMA systems it is known to transmit special synchronizing words. These can be utilized if they are formed or supplemented so that two base station transmitters for the same cell do not only have identical synchronizing words. Alternatively, radio signals digitally modulated with special synchronising words can be transmitted from the base station transmitters solely to enable the mobile station to estimate the differences in arrival times or time shifts. The mobile station transmits information about the estimated arrival time difference or time shift via radio signals to the fixed part of the system, where it is utilized for controlling the transmission time shifting units 2A and 2B. The line and control unit 1 then receives, via the respective line units 5A, 4A and 5B, 4B, information about estimated arrival time difference from the mobile station in the same way as the line and control unit obtains message information from the mobile station.

It is conceivable per se, but hardly to be preferred, to combine both methods for controlling the transmission time shift in a mobile radio system according to FIG. 2.

Measuring the difference in arrival time or time shifting for corresponding radio signals can be performed in a conventional way, e.g. with the aid of correlation. In the cases where the radio signals conventionally contain predetermined synchronizing patterns (words), the time difference between these patterns (words) in different signals can be measured using conventional methods. A mobile station control unit 18 and/or a base station line and control unit 1, 10 in a possible combination with the transceivers' line units 5A and 5B can then comprise time measurement means for estimating reception time shifting or the arrival time comparison units for comparing arrival times.

When so required, a base station preferably utilizes conventionally the same transmitter units and antenna for transmitting, in time multiplex within the same frequency range on the same radio channel, radio signals digitally modulated with message information to different mobile stations associated with the same cell. The radio signals with information to a given mobile station are then transmitted from different base station transmitters with a possible transmission time shift which is specially adjusted with regard to the position of this particular mobile station. The case can arise where a base station in a mobile radio system needs to transmit a radio signal with information intended for reception by several or all of the mobile stations in the cell, e.g. information as to the identity of the base station/cell. Such signals are preferably transmitted without mutual time shifting from the transceivers $B_{ma}$, $B_{mb}$ and $B_{na}$, $B_{nb}$ of the base stations in a mobile radio system according to FIG. 2. The transmission time shifting units are then controlled to a balancing state where the delay of information from the line and control unit 1 to the antenna in one transceiver $B_{ma}$ is equally as great as the delay of information from the line and control unit 1 to the antenna in the other transceiver $B_{mb}$. The corresponding situation can apply when a base station "listens" in unoccupied combinations of time slot and frequency range channel for calls from mobile stations of unknown positions relative to the transceivers of the base stations. The reception time shifting units 3A and 3B can then be controlled to a balancing state where the delay of the message information from the antenna in one transceiver $B_{na}$ to the line and control unit 10 is equally as great as the delay of information from the antenna in the other transceiver $B_{nb}$ to the line and control unit 10.

The mobile stations $MS_1$ and $MS_2$ have adaptive equalizers, whereby the digital modulation during a modulation time interval in the radio signals transmitted from a base station transmitter can be reconstructed from signals received during a reception time interval. In known cellular digital mobile radio systems with only one base station transmitter per cell, the reception time interval of the equalizers is dimensioned according to the dispersion on the radio channel, i.e. expected time shifts between corresponding signals from a single base station transmitter due to multipath propagation and reflections. Because of the equalizer, not only the radio signal having the greatest amplitude or arriving first to the mobile station is utilized for reconstructing the digital modulation, but also other corresponding radio signals arriving with a time shift within the extent of the equalizer's reception time interval can be utilized. The mobile stations in a system in accordance with the invention have equalizers which are dimensioned such that the reception time interval of the mobile station in reconstruction of the digital modulation is greater than the time it takes for signals to propagate a distance as long as the greatest distance between two base station transmitters associated with the same cell within a restricted geographical area. With the base station transmitters placed according to FIG. 1, and the restricted area being the area composed of the cells C1 to C24, the mobile station equalizers would thus be dimensioned for a reception inverval of reconstruction which is greater than 2L/c. Taking into account that there can be dispersion, and that reflections can extend the propagation time from base station transmitter to a mobile station more than the extension of the propagation time from another base station transmitter for the same cell, the reception time interval of the mobile stations is preferably substantially greater than the time it takes for radio signals to propagate a distance which is just as great as the greatest distance between two base station transmitters associated with the same cell within the geographical area in question.

In prior art mobile radio systems it is known to have cells of small size in city areas or densely populated areas with many calls per hour and to have cells of large size in rural areas with few calls per hour. Outside the restricted geographical area composed of cells C1 to C24 in FIG. 1 there might be cells of greater size than that or C1 to C24. Occasionally such cells may have plural base stations transmitting the same information for overcoming radio shadows from mountains. A mobile radio according to the present invention may be used outside the restricted area and in such a cell but the advantages conferred by the present invention can not be expected if the transmission distance between the transmitters assigned to such a cell is too great in relation to the reception time interval.

In mobile radio systems in accordance with the present invention, the modulation time interval of the digital modulation of the signals can be of the same order of magnitude as the time it takes for radio signals to propagate a distance just as long as the greatest transmitting distance between two base station transmitters serving the same cell within a particular area. Although the present invention affords greater advantages, the smaller the modulation time interval is in relation to this propagation time, and the present invention has its greatest importance when the modulation time interval is less than the mentioned propagation time, the present invention can mean substantial advantages even when the modulation time interval is some few times greater than the mentioned propagation time.

It is conceivable to use different kinds of digital modulation in a mobile radio system, whereby somewhat different relationships can exist between information transmission rate and modulation time interval. In digital modulation of the radio signals involving transmission or one symbol at a time of a sequence of uncorrelated symbols, the modulation time interval will be the time during which a single symbol is decisive for the modulation. For example, if a sequence of binary symbols individually and one at a time determine the modulation, the modulation time interval will be the time during which one symbol determines the modulation. This can also be expressed by saying that the modulation time interval will be the inverted value of the transmission rate in bits. In digital modulation or the signals involving two or more at a time of a sequence of digital symbols being decisive for the modulation during wholely or partly overlapping times, the modulation interval can be the time when a preceeding, but not the nearest subsequent symbol affects the modulation. For example, in digital modulation according to SE 8102802-9, FIGS. 1 and 2, a symbol affects the phase of a carrier wave during a time interval 3T. The nearest preceeding symbol also affects the phase change of the carrier wave during a first part 2T of the time interval 3T. The nearest subsequent symbol also affects the change of phase of the carrier wave during a last part or 2T of the time interval 3T. In this case the modulation time interval will be T, which agrees with what is called the symbol time interval in SE 8102802-9. In general, it can be said that the modulation time interval is to be interpreted as the interval in time between two successive changes in the transmitted digital modulation.

A method and a cellular digital mobile radio system in accordance with the present invention is not restricted to the described embodiments, and can be modified within the scope of the claims. For example, it is conceivable to co-locate at least parts of the equipment in an ordinary base station transmitter, with parts of the equipment in the extra base station transmitter for the same cell, providing that their antennas are spaced from each other. In an extreme case it is conceivable in principle to have all equipment except the antennas co-located in one place, e.g. in the vicinity of one of the antennas, and that the antenna are fed with radio frequency signals by cable from this position. By "base station transmitter" is there fore meant at least a transmitter antenna for radio signals and preferably more or fewer of the remaining means required in a base station. In a base station transmitter there are preferably included at least means corresponding to 6A and 6B included in a transceiver unit $B_{ma}$ or $B_{mb}$ in FIG. 2.

We claim:

1. A cellular mobile radio system comprising a plurality of mobile stations which are movable within and between a plurality of cells and a plurality of associated base stations assigned to said cells for digital transmission of message information, each of said plurality of base stations and mobile stations having associated therewith a respective set of a transmitter and a receiver so that said message information in the form of radio signals with digital modulation can be communicated therebetween, said radio signals being digitally modulated with said message information within modulation time intervals, each of said receivers including means for reconstructing the digital modulation from corresponding radio signals received within a predetermined reception time interval; said cells and base stations being associated with one another in a manner such that at least two base station transmitters are assigned to each of predetermined cells within a limited geographic area, said at least two base station transmitters being disposed at a predetermined transmitting distance from each other and each operable to transmit segments of digitally modulated radio signals virtually simultaneously and within the same frequency range with identical message information being transmitted by the other of said at least two base station transmitters to mobile stations within a cell to which both of said transmitters are assigned, the digitally modulated radio signals from said at least two base station transmitters having modulation time intervals which are shorter than the time required for radio signals to propagate a distance which is as long as a greatest transmitting distance between two base station transmitters assigned to one cell within said geographic area, wherein said reconstructing means associated with each of said receivers in said plurality of mobile stations operate to reconstruct digital modulation of corresponding radio signals received during a reception time interval which is at least as long as a time required for radio signals to propagate a distance which is as long as said greatest transmitting distance.

2. A cellular mobile radio system as claimed in claim 1, further comprising:

time measurement means for estimating mutual reception time shifting in a mobile station between digitally modulated radio signals transmitted to said mobile station from a base station transmitter associated with one of said predetermined cells where said mobile station is located, and corresponding digitally modulated radio signals transmitted to said mobile station from another base station transmitter associated with said one of said predetermined cells.

3. A cellular mobile radio system as claimed in claim 2, wherein said time measurement means includes arrival time comparison means associated with said mobile station for comparing arrival times for corresponding digitally modulated radio signals transmitted from different base station transmitters associated with said one of said predetermined cells.

4. A cellular mobile radio system as claimed in claim 2, wherein said time measurement means includes arrival time comparison means associated with one of said at least two base station transmitters for comparing arrival times for digitally modulated radio signals transmitted from a second mobile station in a second of said predetermined cells and received at different base station transceivers associated with said second of said predetermined cells.

5. A cellular mobile radio system as claimed in claim 2, further comprising:

transmission time shifting means for mutually time shifting transmission times of said at least two base station transmitters associated with said one of said predetermined cells such that said at least two base station transmitters transmit corresponding digitally modulated radio signals to said mobile station with greater or less mutual transmission time shifting in response to the estimated reception time shifting.

6. A method in a cellular mobile radio system for digitally transmitting message information between a plurality of mobile radio stations and a plurality of base stations associated with respective cells or said cellular mobile radio system, said message information being in the form of digitally modulated radio signals that are transmitted and received by transmitters and receivers respectively associated with each of said plurality of base and mobile stations, said method comprising the steps of:

transmitting digitally modulated radio signals with identical message information from at least two base stations associated with the same cell, and located at a predetermined distance from one another, to mobile stations within said cell, the digitally modulated radio signals that are transmitted from one of said base stations having certain segments which are transmitted virtually simultaneously and within the same frequency range as digitally modulated radio signals transmitted from the other of said two base stations;

digitally modulating said radio signals at transmission of said message information within modulation time intervals, said modulation time intervals being shorter than the time necessary for radio signals to propagate a distance which corresponds to the greatest transmitting distance between two base stations associated with a cell of said cellular mobile radio system; and reconstructing the digital modulation from corresponding radio signals that are received at a mobile station during a reception time interval, said reception time interval being at least as long as the time required for radio signals to propagate a distance which corresponds to the greatest transmitting distance between said two base stations associated with said cell.

7. A method as claimed in claim 6, wherein said digitally modulated radio signals with identical message information are transmitted from different base station transmitters having mutually variable transmission time shifting capabilities to a predetermined mobile station, and further including the step of selecting said mutually variable transmission time shifting so as to counteract differences in propagation time for said digitally modulated radio signals from said different base station transmitters to said predetermined mobile station.

8. A method as claimed in claim 7 further comprising the steps of:

estimating an arrival time shift between said digitally modulated radio signals with said identical message information from said different base station transmitters at said predetermined mobile station;

transmitting information relating to the estimated arrival time shift from said predetermined mobile station to at least one base station; and utilizing the estimated arrival time shift for selecting transmission time shifting for at least one base station transmitter.

9. A method as claimed in claim 7, further comprising the steps of:

estimating a reception time shift between reception by different base station receivers of corresponding radio signals with identical message information from said predetermined mobile station; and utilizing said reception time shift for selecting said transmission time shift for corresponding base station transmitters.

10. A cellular mobile radio system for communicating message information within a geographic area that is divided into communication cells, comprising:

a plurality of base stations associated with said cells, some of said cells having at least two base stations associated therewith and located a distance from one another to transmit respective radio signals into a cell, which signals are digitally [encoded] *modulated* with the same message information and are transmitted at the same frequency and substantially simultaneously with one another, each base station including means for digitally [encoding] *modulating* the radio signals with message information, said [encoding] *modulating* being carried out with modulation time intervals which are [no longer than] *within a time interval related to* the time required for [audio] *radio* signals to propagate a distance corresponding to the greatest transmitting distance between *said at least* two base stations associated with *said at least* one cell in said system; and a plurality of mobile stations each having means for reconstructing the digital [encoding] *modulation* of plural corresponding radio signals respectively received over the same frequency range during a reception time interval from [the] *said at least* two base stations associated with [a] *said at least* cell, which reception time interval is at least as long as the time required for radio signals to propagate a distance corresponding to the greatest transmitting distance between *said at least* two base stations associated with [a] *said at least one* cell.

*11. The cellular mobile system of claim 10, wherein said time interval is a few times greater than said propagation time.*

*12. The cellular mobile system of claim 10, wherein said at least two base stations associated with a cell are both located within said at least one cell.*

*13. A cellular mobile radio system for communicating message information within a geographic area that is divided into communication cells, comprising:*

*a plurality of base stations for transmitting radio signals into a cell, which signals are digitally modulated with substantially the same message information and are transmitted at the same frequency and substantially simultaneously with one another,*

*each base station including means for digitally modulating the radio signals with message information, said modulating being carried out with modulation time intervals which are at most a few times greater than a time required for radio signals to propagate a distance corresponding to a diameter of said cell; and*

*a plurality of mobile stations each having means for reconstructing the digital modulation of plural corresponding radio signals respectively received over the same frequency during a reception time interval from the plurality of base stations, said reception time interval is at least as long as the time required for radio signals to propagate a distance corresponding to said diameter of said cell.*

*14. A cellular mobile radio system for communicating message information and having a plurality of cells, comprising:*

*a first base station for transmitting a first signal having message information into a cell,*

*a second base station for transmitting a second signal having said message information into said cell,*

*a mobile station in said cell having means for receiving said first and second signals, wherein said first and second signals are received with a propagation delay therebetween,*

*wherein both of said first and second base stations include means for modulating said first and second signals, respectively, with said message information using a modulation time interval which is no longer than a few multiples of said propagation delay, and*

*wherein said mobile station includes means for reconstructing said first and second signals during a reception time interval which is at least as long as said propagation delay.*

*15. The cellular mobile radio system of claim 10, wherein the time interval is less than to a few times greater than the time required for radio signals to propagate the distance corresponding to the greatest transmitting distance between two base stations associated with said at least one cell in said system.*

*16. The cellular mobile radio system of claim 10, wherein said time interval is no longer than the time required for radio signals to propagate the distance corresponding to the greatest transmitting distance between two base stations associated with said at least one cell in said system.*

*17. The cellular mobile radio system of claim 10, wherein said time interval is a few times greater than the time required for radio signals to propagate the distance between two base stations associated with said at least one cell in said system.*

*18. A cellular mobile radio system for communicating message information across an area of coverage, comprising:*

*a plurality of cells, each of said plurality of cells representing a geographic division of said area of coverage;*

*a first base station for transmitting a first signal including message information into at least one of said plurality of cells, said first base station including means for modulating a radio carrier with said message information, said message information being represented by a sequence of symbols;*

*a second base station for transmitting a second signal, including substantially the same message information as transmitted by said first base station, into said at least one of said plurality of cells, said second base station including means for modulating said radio carrier frequency with said substantially the same message information; and*

*at least one mobile station located within said at least one of said plurality of said cells wherein said first and said second signals are received by said mobile station with a time shift therebetween wherein said time shift arises from a difference in a first radio propagation delay between said at least one mobile station and said first base station and a second propagation delay between said at least one mobile station and said second base station, said at least one mobile station further including means for recovering said message information from said first and said second signals during a reception time interval which reception time interval is greater than said time shift.*

*19. The system of claim 18, wherein said time shift is intentionally introduced in the transmission of said first signal and said second signal.*

*20. The system of claim 19, wherein said first base station and said second base station further include means for shifting the transmission time of said first signal and said second signal, respectively.*

*21. The cellular mobile radio system of claim 1, wherein said reconstructing means includes an adaptive equalizer.*

*22. The cellular mobile radio system of claim 10, wherein said reconstructing means includes an adaptive equalizer.*

*23. The cellular mobile radio system of claim 13, wherein said reconstructing means includes an adaptive equalizer.*

*24. The cellular mobile radio system of claim 14, wherein said reconstructing means includes an adaptive equalizer.*

*25. The cellular mobile system of claim 18, wherein said recovering means includes an adaptive equalizer.*

*26. A cellular mobile radio system for communicating message information within a geographic area that is divided into communication cells, comprising:*

*a plurality of base stations associated with said cells, at least one of said cells having at least two base stations associated therewith and located a distance from one another to transmit respective radio signals into said at least one cell, which signals are digitally modulated with substantially the same message information and are transmitted at the same frequency and substantially simultaneously with one another,*

*each base station including a transmitter that digitally modulates the radio signals with message information,*

*said modulation being carried out with modulation time intervals which are within a time interval related to the time required for radio signals to propagate a distance corresponding to the greatest transmitting distance between said at least two base stations associated with said at least one cell in said system; and*

*a plurality of mobile stations each having a receiver that reconstructs the digital modulation of plural corresponding radio signals respectively received over the same frequency range during a reception time interval from said at least two base stations associated with said at least one cell, which reception time interval is at least as long as the time required for radio signals to propagate a distance corresponding to the greatest transmitting distance between said at least two base stations associated with said at least one cell.*

*27. The cellular mobile system of claim 26, wherein said time interval is a few times greater than said propagation time.*

*28. The cellular mobile system of claim 26, wherein said at least two base stations associated with a cell are both located within said at least one cell.*

*29. A cellular mobile radio system for communicating message information within a geographic area that is divided into communication cells, comprising:*

*a plurality of base stations for transmitting radio signals into a cell, which signals are digitally modulated with substantially the same message information and are transmitted at the same frequency and substantially simultaneously with one another,*

*each base station including a transmitter that digitally modulates the radio signals with message information, said modulation being carried out with modulation time intervals which are at most a few times greater than a time required for radio signals to propagate a distance corresponding to a diameter of said cell; and*

*a plurality of mobile stations each having a receiver that reconstructs the digital modulation of plural corresponding radio signals respectively received over the same frequency during a reception time interval from the plurality of base stations, said reception time interval is at least as long as the time required for radio signals to propagate a distance corresponding to said diameter of said cell.*

*30. A cellular mobile radio system for communicating message information and having a plurality of cells, comprising:*

*a first base station for transmitting a first signal having message information into a cell,*

*a second base station for transmitting a second signal having said message information into said cell,*

*a mobile station in said cell having a receiver that receives said first and second signals, wherein said first and second signals are received with a propagation delay therebetween,*

*wherein both of said first and second base stations include a transmitter that modulates said first and second signals, respectively, with said message information using a modulation time interval which is no longer than a few multiples of said propagation delay, and*

*wherein said mobile station receiver reconstructs said first and second signals during a reception time interval which is at least as long as said propagation delay.*

*31. The cellular mobile radio system of claim 30, wherein said time interval is less than to a few times greater than the time required for radio signals to propagate the distance corresponding to the greatest transmitting distance between two base stations associated with said at least one cell in said system.*

*32. The cellular mobile radio system of claim 30, wherein said time interval is no longer than the time required for radio signals to propagate the distance corresponding to the greatest transmitting distance between two base stations associated with said at least one cell in said system.*

*33. The cellular mobile radio system of claim 30, wherein said time interval is a few times greater than the time required for radio signals to propagate the distance between two base stations associated with said at least one cell in said system.*

*34. A cellular mobile radio system for communicating message information across an area of coverage, comprising:*

*a plurality of cells, each of said plurality of cells representing a geographic division of said area of coverage;*

*a first base station for transmitting a first signal including message information into at least one of said plurality of cells, said first base station including a transmitter that modulates a radio carrier with said message information, said message information being represented by a sequence of symbols;*

*a second base station for transmitting a second signal, including substantially the same message information as transmitted by said first base station, into said at least one of said plurality of cells, said second base station including a transmitter that modulates said radio carrier frequency with said substantially the same message information; and*

*at least one mobile station located within said at least one of said plurality of said cells wherein said first and said second signals are received by said mobile station with a time shift therebetween wherein said time shift arises from a difference in a first radio propagation delay between said at least one mobile station and said first base station and a second propagation delay between said at least one mobile station and said second base station said at least one mobile station further including a receiver that recovers said message information from said first and said second signals during a reception time interval which reception time interval is greater than said time shift.*

*35. The system of claim 34, wherein said time shift is intentionally introduced in the transmission of said first signal and said second signal.*

*36. The system of claim 34, wherein said first base station and said second base station further include a time measurement unit that shifts the transmission time of said first signal and said second signal, respectively.*

*37. A cellular mobile radio system for communicating message information across an area of coverage, comprising:*

*a plurality of cells, each of said plurality of cells representing a geographic division of said area of coverage;*

*a first base station for transmitting a first signal including message information into at least one of said plurality of cells said first base station including a transmitter that modulates a radio carrier with said message information, said message information being represented by a sequence of symbols;*

*a second base station for transmitting a second signal, including substantially the same message information as transmitted by said first base station, into said at least one of said plurality of cells, said second base*

*station including a transmitter that modulates said radio carrier frequency with said substantially the same message information; and*

*at least one mobile station located within said at least one of said plurality of said cells, wherein said first and said second signals are received by said mobile station with a time of arrival difference therebetween;*

*said at least one mobile station further including a receiver that combines said message information from said first and said second signals received during a reception time interval which reception time interval is greater than said time of arrival difference.*

*38. A cellular mobile radio system for communicating message information and having a plurality of cells, comprising:*

*a first base station for transmitting a first signal having message information into a cell,*

*a second base station for transmitting a second signal having said message information into said cell,*

*a mobile station in said cell having means for receiving said first and second signals, wherein said first and second signals are received with a propagation delay therebetween,*

*wherein both of said first and second base stations include means for modulating said first and second signals, respectively, with said message information using a modulation time interval which is no longer than a few multiples of said propagation delay, and*

*wherein said mobile station includes means for combining information from said first and second signals received during a reception time interval which is at least as long as said propagation delay.*

*39. A cellular mobile radio system for communicating message information across an area of coverage, comprising:*

*a plurality of cells, each of said plurality of cells representing a geographic division of said area of coverage;*

*a first base station for transmitting a first signal including message information into at least one of said plurality of cells, said first base station including a transmitter that modulates a radio carrier with said message information, said message information being represented by a sequence of symbols;*

*a second base station for transmitting a second signal, including substantially the same message information as transmitted by said first base station, into said at least one of said plurality of cells, said second base station including a transmitter that modulates said radio carrier frequency with said substantially the same message information; and*

*at least one mobile station located within said at least one of said plurality of said cells*

*wherein said first and said second signals are received by said mobile station with a time shift therebetween wherein said time shift arises from a difference in a first radio propagation delay between said at least one mobile station and said first base station and a second propagation delay between said at least one mobile station and said second base station*

*said at least one mobile station further including a receiver that combines said message information from said first and said second signals received during a reception time interval which reception time interval is greater than said time shift.*

* * * * *

UNITED STATES PATENT AND TRADEMARK OFFICE

CERTIFICATE OF CORRECTION

PATENT NO. : Re. 36,017

DATED : December 29, 1998

INVENTOR(S) : Jan E. UDDENFELDT et al.

It is certified that error appears in the above-indentified patent and that said Letters Patent is hereby corrected as shown below:

Column 12, line 47, change "some" to --at least one--

Column 12, line 50, change "a" to --said at least one--

Column 12, line 51, change "with the" to --with substantially the--

Column 13, line 3, change "least cell" to --least one cell--.

Signed and Sealed this

Eighteenth Day of May, 1999

*Attest:*

*Attesting Officer*

Q. TODD DICKINSON

*Acting Commissioner of Patents and Trademarks*

UNITED STATES PATENT AND TRADEMARK OFFICE

CERTIFICATE OF CORRECTION

PATENT NO. : RE 36,017
DATED : December 29, 1998
INVENTOR(S) : Jan E. Uddenfeldt et al.

It is certified that error appears in the above-identified patent and that said Letters Patent is hereby corrected as shown below:

Title page,
In the continuing data before the first line of the Specification, please append the following:
-- "Reissue Application 09/217,577 has been filed on this reissue on December 21, 1998" --.

Signed and Sealed this

Twenty-sixth Day of February, 2002

*Attest:*

*Attesting Officer*

JAMES E. ROGAN
*Director of the United States Patent and Trademark Office*